United States Patent
Eksin et al.

[11] Patent Number: 6,145,925
[45] Date of Patent: Nov. 14, 2000

[54] BACKREST FOR VEHICLE SEATS

[75] Inventors: Harum Eksin, Gaeufelden; Hermann Kohfink, Laichingen; Karl Pfahler, Stuttgart; Rolf Schwarz, Wildberg, all of Germany

[73] Assignee: DaimlerChrysler AG, Stuttgart, Germany

[21] Appl. No.: 09/444,566

[22] Filed: Nov. 19, 1999

[30] Foreign Application Priority Data

Dec. 9, 1998 [DE] Germany ............ 198 51 209

[51] Int. Cl.⁷ .................................................. A47C 31/00
[52] U.S. Cl. ................................ 297/180.14; 297/284.4
[58] Field of Search ........................ 297/180.1, 180.13, 297/180.14, 284.4, 284.1, 452.42

[56] References Cited

U.S. PATENT DOCUMENTS

| | | |
|---|---|---|
| 4,880,271 | 11/1989 | Graves . |
| 5,102,189 | 4/1992 | Saito et al. . |
| 5,902,014 | 5/1999 | Dinkel et al. . |
| 5,927,817 | 7/1999 | Ekman et al. . |
| 6,019,420 | 2/2000 | Faust et al. . |

FOREIGN PATENT DOCUMENTS

| | | |
|---|---|---|
| 2947472 | 6/1988 | Germany . |
| 19628688 | 11/1997 | Germany . |
| 29718853 | 2/1998 | Germany . |

*Primary Examiner*—Milton Nelson, Jr.
*Attorney, Agent, or Firm*—Evenson, McKeown, Edwards & Lenahan, P.L.L.C.

[57] ABSTRACT

A backrest for vehicle seats, has a backrest frame, a backrest cushion which is fastened thereto and consists of a cushion layer and of a ventilation layer which covers the cushion layer and through which air can flow. A fan is provided for the active ventilation of the backrest cushion. For the purpose of improving the sitting comfort, the vehicle seat is equipped with a lordosis support, the fan being fastened largely centrally in the cushion area on the lordosis support at low vibrations. The fan is situated inside an air duct constructed in the cushion layer, the clear cross-section of the air duct being dimensioned such that the fan remains inside the air duct during its movement going along with the lordosis adjustment.

7 Claims, 1 Drawing Sheet

BACKREST FOR VEHICLE SEATS

BACKGROUND AND SUMMARY OF THE INVENTION

This application claims the priority of German application 198 51 209.0, filed in Germany on Dec. 9, 1998, the disclosure of which is expressly incorporated by reference herein.

The invention relates to a backrest for vehicle seats comprising a backrest frame, a backrest cushion which is fastened to the backrest frame, a foamed cushion layer, a ventilation layer which covers the cushion layer formed as a coarse-mesh spaced knit through which air flows, and a ventilator fan for the active ventilation of the backrest cushion.

In the case of a known backrest of this type (German Patent Document DE 196 28 688C1), the backrest cushion is normally constructed with a backrest surface and two lateral edge elevations. Between the backrest cushion and an air-tight backrest rear wall, a hollow space is constructed which is open at the lower end of the backrest. In the hollow space, specifically close to the lower end of the backrest, a fan, which has an intake opening pointing to the open end of the hollow space, is arranged laterally in the area of an edge elevation. The blow-out opening of the fan is connected with a flexible duct which, in the surface area at the lower end of the backrest cushion, leads into its ventilation layer. The air delivered by the fan flows in the backrest surface area through the ventilation layer in order to ventilate the seat surface by way of the breathing cushion covering and to dehumidify corresponding body regions of the seat user. The two edge elevations are ventilated separately by means of one miniature fan respectively, which are inserted into air ducts cut into the cushion layer and also take in air from the hollow space.

A known backrest for motor vehicle seats (German Patent Document DE 29 47 472 C2) has a support part, the so-called lordosis support, which is constructed as a flat curved section and, in an adaptation to the seat user's spinal column, is curved toward the front, one end of this support part being assigned directly to the backrest frame and the other end of the support part being supported on the backrest frame by means of an adjusting device which influences the curvature of the arch of the support part and has a horizontal-axis drive which acts upon the adjusting elements, in which case the adjusting elements act upon the upper end of the support part in the sense of a curvature change and act upon the vertex area of the support part in the sense of a position change of the vertex of the curvature.

A vehicle seat is known which has an active ventilation of the seat surface by means of a ventilator arranged below the seat cushion (German Patent Document DE 297 18 853 U1), in the case of which fastening devices are provided such on the fan housing or ventilator housing that they can be hung in a form-locking manner into spring bars which are disposed under the seat cushion, are bent in a meander-shaped manner and are used for the spring suspension of the seat.

It is an object of the invention to design a vehicle seat of the initially mentioned type, which is to be equipped with a lordosis support, with respect to an active ventilation of the backrest cushion, particularly of the backrest surface, at reasonable cost.

According to the invention this object is achieved by providing an arrangement of the above-noted type, wherein a mechanical lordosis support, which can be adjusted for an adaptation to the spinal column curvature of a seat user is fastened to the backrest frame, and wherein the fan is fastened largely centrally in the cushion area on the lordosis support at low vibrations such that it moves along without force in any adjustment of the lordosis support and in this case remains within an air duct sufficiently dimensioned for this purpose in the clear cross-section, which air duct penetrates the cushion layer from its rearward side facing the lordosis support to the ventilation layer.

The backrest according to the invention has the advantage that, despite the presence of the lordosis support, the fan can be placed centrally in the backrest cushion and therefore has an optimal position for the whole-surface uniform cushion ventilation so that a single fan is sufficient for the active cushion ventilation. The fan is installed without force so that, in the sat-in condition of the vehicle seat, it is subjected to no deformation and pressure forces and can therefore not be damaged. As the result of the elastic connection of the fan with the lordosis support and the good uncoupling of the lordosis support with respect to the backrest frame and, because of the fact that the fan does not come in direct contact with the backrest cushion, no special measures are required for damping vibrations. The fan is easily mountable and is easily accessible by way of the lordosis support so that it can easily be exchanged in the event of a repair.

Advantageous embodiments of the backrest according to the invention with expedient developments and further developments of the invention are found in the additional claims.

According to a preferred embodiment of the invention, the ventilator is elastically fastened on two transversely spaced, forward-arched longitudinal struts of the lordosis support whose arching degree can be adjusted and which receive transverse struts used for supporting the seat user's back. This has the advantage that, when the lordosis support is adjusted, the fan moves along without force, moving in the area of the air duct without leaving it or pressing against the cushion layer.

Other objects, advantages and novel features of the present invention will become apparent from the following detailed description of the invention when considered in conjunction with the accompanying drawings.

DETAILED DESCRIPTION OF THE DRAWINGS

Figure 1:
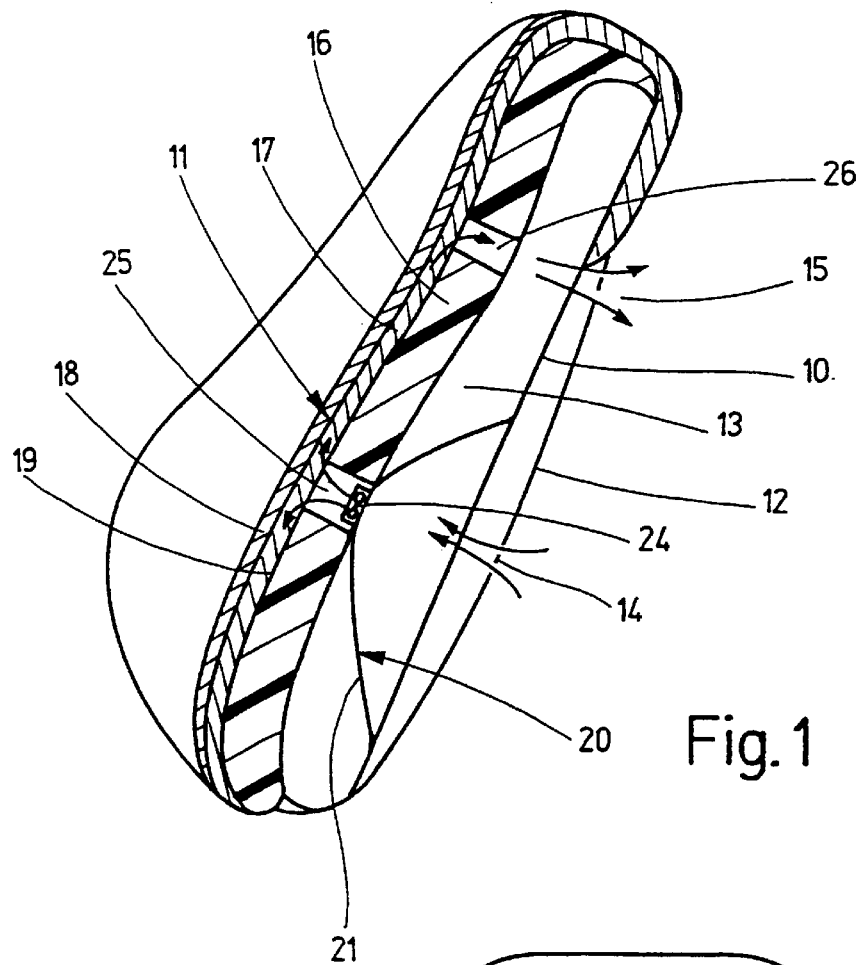
FIG. 1 is a longitudinal sectional view of a backrest with a backrest frame, a lordosis support and a backrest cushion, constructed according to a preferred embodiment of the present invention.
Figure 2:
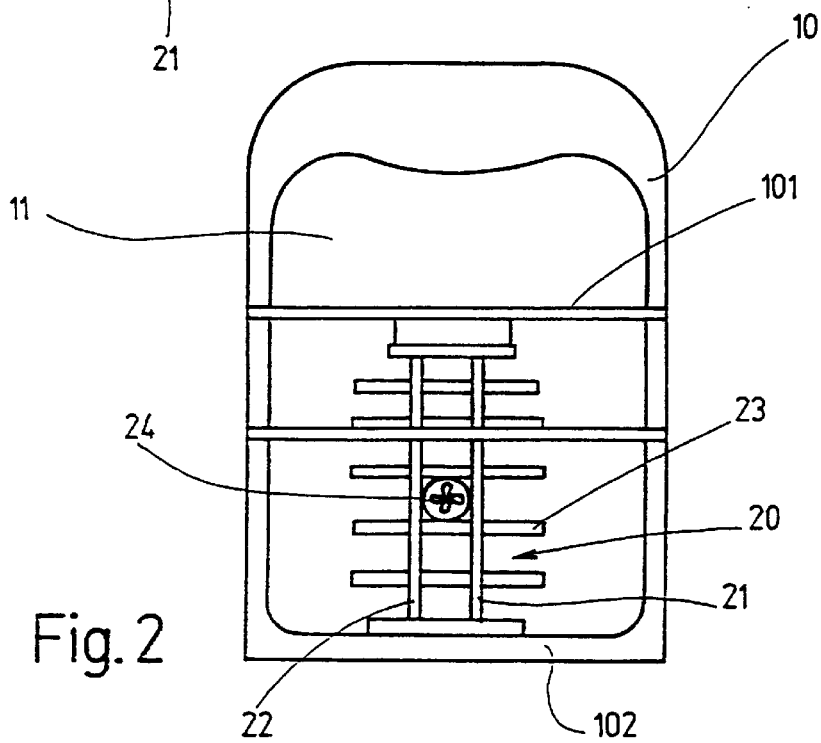
FIG. 2 is a back view of the backrest of FIG. 1, showing the same backrest while the backrest wall is removed for illustration purposes.

The backrest for a vehicle seat schematically illustrated in FIGS. 1 and 2, in a known manner, has a backrest frame 10 and a backrest cushion 11 which is fastened to the backrest frame and which, on the front side of the backrest frame facing the seat user, covers the backrest frame 10. The rearward side of the backrest frame 10 is covered such by means of a backrest rear wall 12 that a hollow space 13 extending through the whole backrest 10 remains between the backrest cushion 11 and the backrest rear wall 12. By way of openings 14, 15, the hollow space 13 is in an air exchange connection with the seat environment. In the embodiment of FIG. 1, the two openings 14, 15 are provided in the backrest rear wall 12 at a distance from one another.

However, they may also be arranged on the bottom and top side of the backrest.

The backrest cushion 11 is composed of a cushion layer 16 made of a foam material which is supported on the backrest frame 10; of a ventilation layer 17 which covers the cushion layer 16 and through which air flows and which is preferably made of a coarse-mesh spaced knit, and of an air-tight cushion covering 18 which spans the backrest cushion 11 on the front side. Between the ventilation layer 17 and the cushion cover 18—as in this case—, an air-permeable pressure distribution layer 19 may also be inserted.

For ensuring a high sitting comfort, a mechanical lordosis support 20, which can be adjusted for an adaptation to the spinal column curvature of the seat user, is fastened to the backrest frame 10. As illustrated particularly in FIG. 2, the lordosis support 20 has two transversely spaced, parallel, forward-arched longitudinal struts 21 22 which are fastened on the end side to two transverse spars 101 and 102 of the backrest frame 10. The longitudinal struts 21, 22 which, on their front side facing the seat user, carry transverse struts 23 for supporting the back, can be adjusted by means of a mechanism which is not shown with respect to the degree of their arching.

For improving the sitting comfort with respect to the climate, the backrest cushion 11 is actively ventilated by means of a ventilator or a fan 24 in order to remove by way of this air current heat and moisture out of the backrest cushion 11. The fan 24 is fastened largely centrally in the cushion area on the lordosis support at low vibrations such that it moves along without force in any adjustment of the lordosis support 20. In the cushion layer 16 of the backrest cushion 11, an air duct 25 is constructed which is aligned with the fan 24 and penetrates the cushion layer 16 from its rearward side facing the lordosis support 20 to the ventilation layer 17. The clear opening of the air duct 25 is dimensioned such that the fan 24 projects into the air duct 25 and, during the adjustment of the lordosis support 20 along its whole adjusting range, remains within the air duct 25. The fan 24 is elastically fastened to the lordosis support 20, specifically on its forward-arched two longitudinal struts 21, 22. The fan 24 is not connected with the force and pressure absorbing cross struts 23 of the lordosis support 20.

The fan takes in air from the hollow space 13 which flows by way of the lower opening 14 of the backrest rear wall 12 into the hollow space, and blows it through the air duct 25 into the ventilation layer 17. The air flows through the ventilation layer 17 and, partially by way of the air-permeable pressure distribution layer 19 and the air-permeable cushion cover 18, flows out at the surface of the backrest cushion 11 and continues to flow by way of an air duct 26 also penetrating the cushion layer 16 at a distance from the air duct 25, in the upper area of the backrest, again into the hollow space 13 in order to flow here by way of the top opening 13 in the backrest rear wall 12 out into the seat environment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Backrest for vehicle seats, comprising:
    a backrest frame,
    a backrest cushion which is fastened to the backrest frame,
    a foamed cushion layer,
    a ventilation layer which covers the cushion layer formed as a coarse-mesh spaced knit through which air flows, and
    a ventilator fan for active ventilation of the backrest cushion,
    wherein a mechanical lordosis support, which can be adjusted for an adaptation to a spinal column curvature of a seat user is fastened to the backrest frame, and
    wherein the fan is fastened largely centrally in a cushion area on the lordosis support at low vibrations such that it moves along without force in any adjustment of the lordosis support and in this case remains within an air duct sufficiently dimensioned for this purpose in a clear cross-section, which air duct penetrates the cushion layer from its rearward side facing the lordosis support to the ventilation layer.

2. Backrest according to claim 1, wherein the fan is elastically fastened on two transversely spaced, forward-arched longitudinal struts of the lordosis support which can be adjusted in their arching degree and receive transverse struts used for supporting the seat user's back.

3. A vehicle seat backrest assembly, comprising:
    a backrest frame,
    a backrest cushion fastened to the backrest frame
    a cushion layer supported on the backrest frame between the cushion and the frame, said cushion layer including an air duct through opening,
    a ventilation layer disposed between the cushion layer and the cushion,
    a mechanical lordosis support fastened to the backrest frame, said lordosis support being adjustable to adapt to a spinal column curvature of a seat occupant, and
    a ventilation fan fastened to the lordosis support for movement together therewith, said ventilation fan being positioned in said air duct opening of the cushion layer and being operable to provide ventilating air to the ventilation layer.

4. A vehicle seat backrest assembly according to claim 3, wherein the lordosis support includes a pair of transversely spaced forwardly arched longitudinal struts and a plurality of vertically spaced transverse struts carried by the longitudinal struts, and
    wherein the fan is elastically supported at the longitudinal struts.

5. A vehicle seat backrest assembly according to claim 4, wherein the transverse struts are configured to absorb forces from an occupant, said fan being not connected with these cross struts.

6. A vehicle seat backrest assembly according to claim 4, wherein said air duct opening and fan are disposed centrally of the cushion layer.

7. A vehicle seat backrest assembly according to claim 6, wherein said cushion layer includes an air outlet flow opening spaced from the air duct opening.

* * * * *